April 14, 1964  G. P. KATONA  3,129,108
ELECTROLUMINESCENT CELL AND METHOD
Filed Dec. 23, 1960

INVENTOR.
GABRIEL P. KATONA
BY Clarence R. Patty, Jr.
ATTORNEY

3,129,108
ELECTROLUMINESCENT CELL AND METHOD
Gabriel P. Katona, Corning, N.Y., assignor to Corning Glass Works, Corning, N.Y., a corporation of New York
Filed Dec. 23, 1960, Ser. No. 78,022
9 Claims. (Cl. 117—33.5)

This invention relates to electroluminescent cells and more particularly to a method for forming a glass- and/or ceramic-embedded phosphor layer for use in an electroluminescent cell.

In the typical electroluminescent cell, the phosphor is embedded in a suitable binder which may be composed of a glass or glass-ceramic material. To complete the cell, electrodes are placed on both sides of the embedded phosphor at least one of which is transparent. Thus, when a voltage is applied across the electrodes, the resulting electric field causes the phosphor to emit light.

The prior art methods of embedding the phosphor in the desired embedding medium or binder consist of intimately mixing the binder and the phosphor in the desired proportions and firing the cell in a furnace, the maximum temperature of which is sufficient to completely fuse the embedding material. Once the firing temperature has been reached, the binder material consolidates thereby forming a fused mass with the phosphor particles uniformly distributed therein.

It is a recognized fact that many embedding materials exhibit certain favorable properties such as a high dielectric constant etc., but do not possess a sufficiently low firing temperature. In fact, many of these desirable materials require firing temperatures which would destroy the usefulness of the phosphor when the mixture is brought to the required firing temperature. Therefore, the state of the art has made concessions in favor of lower-firing binder materials. These materials, while not capable of producing cells with the most desirable characteristics certainly produce usable cells, albeit limited in performance by reason of the particular binder used and distinguished by the fact the firing temperature will not be high enough to reduce the effectiveness of the phosphor material.

Other difficulties which are brought about by the prior art method of forming the embedded phosphor reside in the mechanics of the operation. In the prior art methods, the phosphor-binder mixture is applied to a substrate and fired in the furnace at a required temperature. By so doing, two difficulties arise. Firstly, the base or substrate on which the phosphor-binder mixture rests provides a heat sink thereby allowing the outermost portions of the mixture to reach the firing temperature considerably sooner than that portion of the mixture which rests on the substrate. Thus, a skin will form on the mixture which makes it difficult for the cell to become completely degassed and resulting in the entrapment of air bubbles within the body of the final cell. Simply stated, the skin that is formed is in the nature of a consolidated mass that prevents the interstitial gasses from leaving the lower strata or unconsolidated portion of the mixture, thereby precluding a homogeneous fusion. To overcome this problem, the mixture must be maintained at the firing temperature for an extended period of time, thereby increasing the possibility of damaging the phosphor. Under ideal circumstances, the surface of the embedded bonded phosphor layer should be glazed, smooth and free from pits, holes and protrusions. Additionally, the embedded phosphor layer itself should be free of any voids.

The other major difficulty encountered by the prior art method of embedding the phosphor is that difficulty encountered in resolving the difference in temperature that exists between the firing temperature of the mixture and the deformation temperature of the substrate particularly in the case of glass substrates. It is a common procedure to first coat one side of the substrate with an electroconductive coating of the type suggested by J. M. Mochel in his Patent No. 2,564,706, issued on August 21, 1951, and assigned to the assignee of the instant application. This conductive coating provides one electrode for the completed cell. The phosphor-binder mixture is then applied to the electroconductive coating and the entire substrate-coating-mixture is placed into the furnace. When so placed in the furnace the conductive coat, which is in the center portion, is the last to receive furnace heat while the outermost portions of the combination, the upper layer of the mixture and the opposite surface of the substrate is the first. Since the electroconductive coat is of a highly brittle nature, when the furnace heat deforms the substrate, the electroconductive coat develops cracks therein due to the resultant strain, thereby decreasing the overall conductivity of the conductive layer.

I have discovered a process for embedding phosphor particles in a glass and/or ceramic binder for use in an electroluminescent cell that overcomes the inherent disadvantages of the prior art method of firing. To minimize the damage to the phosphor particles and to minimize any damage to the electroconductive coating, a special firing of the phosphor-binder layer is achieved by allowing the electrode, as represented by the electroconductive coating on the glass substrate, to accomplish the firing. To do this, the tin oxide or electroconductive coating on the glass substrate is subjected to a relatively high electrical current thereby radiating heat. It is this radiated heat that achieves a quick firing of the layer without exposing the cell to prolonged heating.

It is therefore an important object of the present invention to produce an electroluminescent cell wherein the phosphor has not been subjected to the deleterious effect of prolonged or excessive heat.

Another important object of the present invention is to produce an electroluminescent cell wherein the electroconductive coating has not been subjected to the deleterious effect of prolonged or excessive stress and/or strain.

Still another important object of the present invention is to produce an electroluminescent cell wherein the embedded phosphor layer is noted by its smooth glazed surface.

A further important object of the present invention is to produce an electroluminescent cell wherein the embedded phosphor layer is noted by its lack or minimum of voids or pits.

A still further important object of the present invention is to provide a method of producing an electroluminescent cell noted by its ease of reproduction and which process lends itself easily to mass production.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing, in which, by way of example, only the preferred embodiments of this invention are illustrated.

Figure 1:
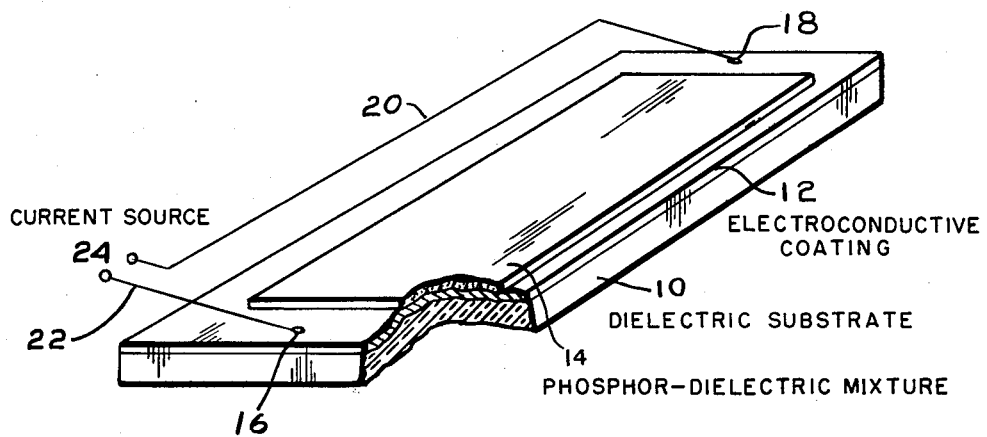
FIGURE 1 is a diagrammatic and schematic representation illustrating a step of my novel process immediately preceding firing.
Figure 2:
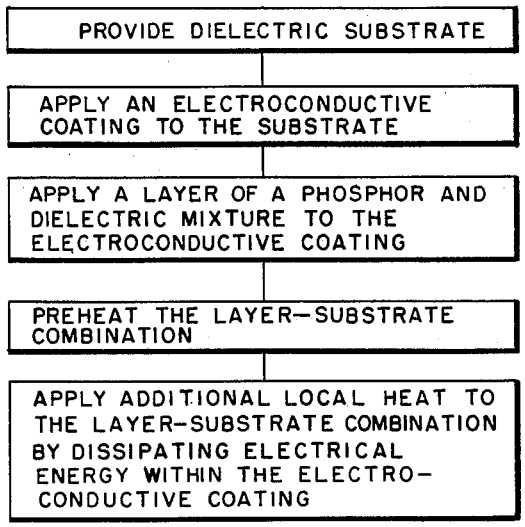
FIGURE 2 is a flow diagram illustrating the steps of one embodiment of the process of this invention.

Referring now to the figures, substrate 10 has an electroconductive coating 12 applied thereto. Overlying this conductive coating is the embedding material—phosphor mixture 14. To complete this aspect of my invention, leads 22 and 20 apply the current from source 24 to contact points 16 and 18 respectively on conductive coating 12.

It should be here noted that contact points 16 and 18 should be positioned so that the current flow therebetween will produce the desired heat under the greatest area of phosphor-embedding material mixture. The steps of my invention are as follows:

The phosphor-embedding material mixture is applied in a conventional manner to an electroconductive coated substrate. Electrical contact is established to the EC coating as indicated in FIG. 1.

With any given electroconductive film, only a certain amount of current is capable of being passed. The amount of current which is capable of being passed is dependent on the composition of the coating material, its thickness, etc., and represents the maximum allowable current density. Another limiting factor is the substrate material itself. Knowing that the electroconductive coating is brittle, it is imperative that the temperature of the substrate be maintained below its softening point in order to avoid breaking the coating by deforming the substrate. It is also maintained at or above its annealing temperature and subsequently cooled in accordance with known techniques to insure that no deleterious tensional stresses will be set up in the substrate-glass.

The particular substrate used is determined by the temperature required to fuse the phosphor-embedding material and the thermal expansion compatibility between the substrate and the embedding material. Knowing the final temperature required to fuse this mixture, a substrate material is chosen so that the firing temperature of the embedding material falls between the annealing temperature and the softening temperature of the substrate. This now takes into consideration the added heat supplied by the heated electroconductive coat.

Thus, by way of a hypothetical example only, if a phosphor-embedding mixture requires a temperature of 650° C. to completely fuse, the annealing point of the substrate is below 600° C., then the cell is preheated to or above the annealing point of the substrate. Thus, utilizing this temperature, any further sudden application of local heat will not induce stresses that may cause thermal breakage in the substrate.

The necessary preheat temperature and other operating parameters that must be known to practice my invention may be readily determined by simple experimentation, taking into consideration the characteristics of the substrate used, the characteristics of the embedding frit as well as the current density, current time and voltage required to produce a completely glazed phosphor-binder mixture. The time for this additional heating is determined principally by the thickness of the phosphor-binder mixture and by the softening temperature of the binder material.

As an operative embodiment of my invention, utilizing the conventional soda-lime window glass as a substrate with a zinc-borosilicate glass embedding material having a softening point of about 510° C. and an electroconductive coating comprising about 97% $SnO_2$ and 3% $Sb_2O_3$ and applied as suggested in U.S. Patent No. 2,564,706, issued in the name of John M. Mochel, and assigned to the same assignee as the subject application, the following parameters are suggested:

| Pre-Heat Temp. (° C.) | Power Applied (Watts) | Time of Applied Power (Min.) | Total Applied Energy (Watt-Min.) |
|---|---|---|---|
| 500 | 24.5 | 9 | 221 |
| 505 | 15.15 | 6 | 91.0 |
| 550 | 4.32 | 10 | 43.2 |
| 550 | 7.00 | 10 | 70.0 |
| 550 | 13.60 | 5 | 68.0 |

As a rough guide to the limits of the parameters, it was found during the course of experimenting with the above information that when utilizing a conventional soda-lime window glass substrate in combination with the embedding material consisting of a zinc-borosilicate glass frit having a softening point of about 510° C., utilizing a preheat of about 500° C. and an applied power to the electroconductive film of about 90 watts, a break in the electroconductive film appeared after about three minutes. Additionally, when utilizing the same material, a preheat of 595° C., utilizing power of about 43 watts per minute applied to the electroconductive coat, a break appeared in the electroconductive coat after about 2 minutes.

Having described one embodiment utilizing the joule heating effect to achieve the additional local heat necessary to completely embed the phosphor, it will be obvious to those skilled in the art that still another embodiment may be successfully utilized. This involves the use of either radio frequency heating or induction heating to supply the necessary additional local heat. Since the electroconductive coating 12 is a good susceptor it then only becomes necessary to plate the unfired cell in the RF field or in the field of the induction furnace to produce the required heat. In this embodiment, too, it will be necessary to carefully program the total current passing through the electroconductive film so as not to exceed its current carrying ability and thereby produce cracks or breaks.

Still another embodiment will now become obvious to those skilled in the art, that is, an embodiment wherein a metallic backing plate is substituted for the entire substrate-electroconductive film combination. In this particular embodiment, the phosphor-binder material is placed directly on the metal backing plate and brought to the necessary preheat before applying either the voltage and current to produce the joule effect heat or in the alternative, the RF or induction heat.

While I have described what are presently considered the preferred embodiments of my invention it will be obvious to those skilled in the art that various other changes and modifications may be made therein without departing from the inventive concept, and it is, therefore, aimed in the appended claims to cover all such changes and modifications as fall within the true spirit and scope of my invention.

What is claimed is:

1. A process for forming an electroluminescent cell having a glass substrate comprising the steps of applying an electroconductive coating to one side of said substrate, applying to said electroconductive coating a layer of a mixture of phosphor and a dielectric binder material selected from the group consisting of glass and ceramic, preheating the unit so formed to a point below the firing temperature of said binder material and, applying sufficient additional local heat to said layer by dissipating electrical energy within said electroconductive coating to raise the temperature of said layer to the firing temperature thereof.

2. The process of claim 1 wherein said local heat is added to said layer by applying electrical power to said electroconductive coating whereby said coating dissipates said applied power in the form of heat.

3. The process of claim 1 wherein said local heat is added to said layer by placing the electroconductive coating-layer combination in the field of an induction furnace.

4. The process of claim 1 wherein said local heat is added to said layer by placing said electroconductive coating-layer combination in a radio frequency field.

5. A process for forming an electroluminescent cell having a conductive substrate comprising the steps of applying to said substrate a layer of a mixture of phosphor and a dielectric binder material selected from the group consisting of glass and ceramic, preheating said layer-substrate combination to a point below the firing temperature of said binder material and, applying sufficient additional local heat to said layer by means of said conductive substrate to raise the temperature of said layer to the firing temperature thereof.

6. The process of claim 5 wherein the conductive substrate is a metallic backing plate.

7. The process of claim 6 wherein said local heat is added to said layer by applying electrical power to said metallic backing plate whereby said backing plate dissipates said applied power in the form of heat.

8. The process of claim 7 wherein said local heat is added to said layer by placing the conductive substrate-layer combination in a radio frequency field.

9. The process of claim 7 wherein said local heat is added to said layer by placing the metallic backing plate-layer combination in the field of an induction furnace.

References Cited in the file of this patent

UNITED STATES PATENTS

| | | |
|---|---|---|
| 2,765,419 | Roberts | Oct. 2, 1956 |
| 2,791,723 | Nagy et al. | May 7, 1957 |
| 2,840,741 | Lehman | July 24, 1958 |
| 2,865,790 | Baer | Dec. 23, 1958 |
| 2,880,552 | Whitehurst | Apr. 7, 1959 |
| 2,966,604 | Dombrowski | Dec. 27, 1960 |
| 2,988,661 | Goodman | July 13, 1961 |